No. 774,359. Patented November 8, 1904.

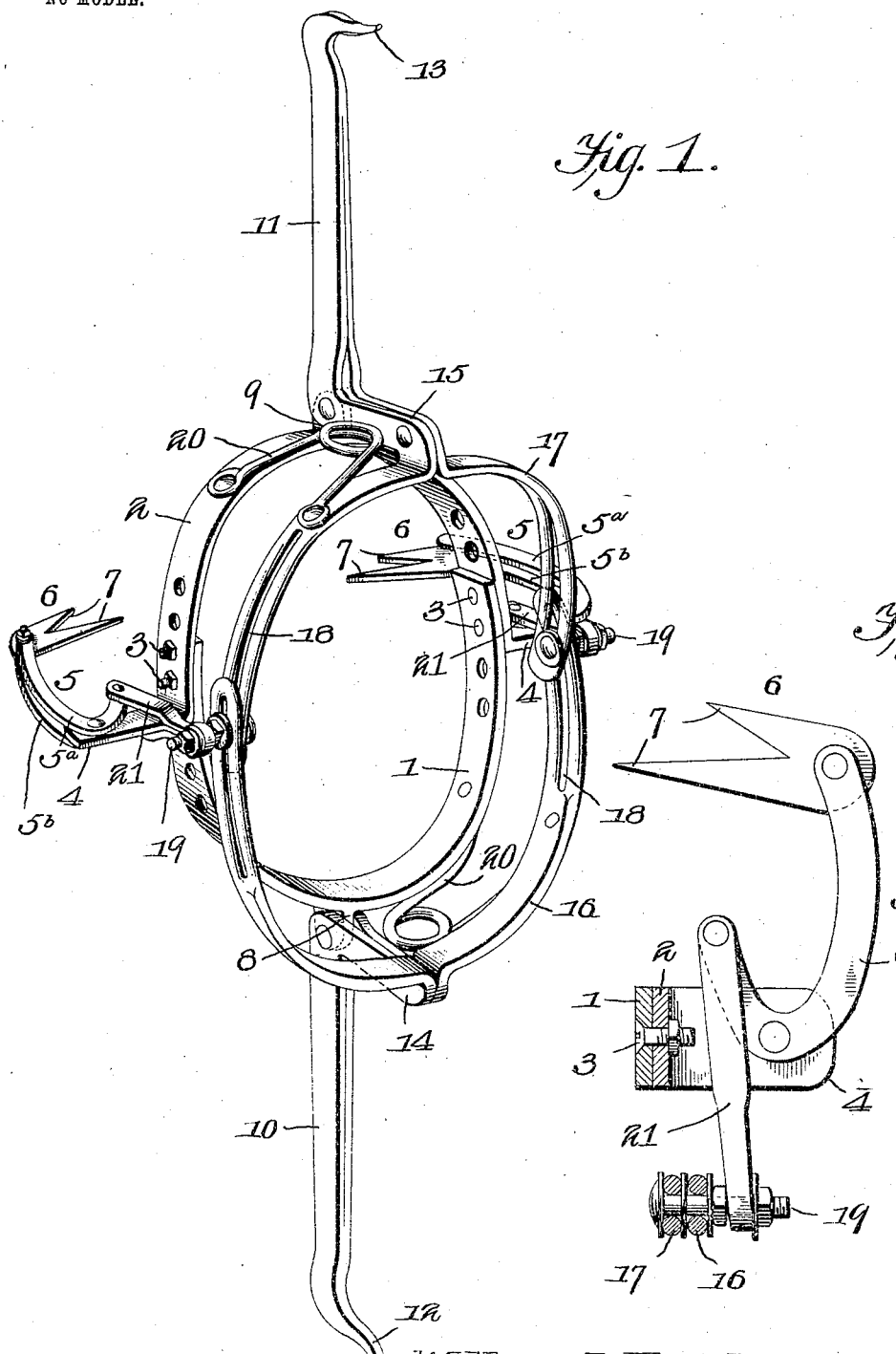

UNITED STATES PATENT OFFICE.

WILLIAM L. F. MALABY, OF GOLTRY, OKLAHOMA TERRITORY.

ANIMAL-POKE.

SPECIFICATION forming part of Letters Patent No. 774,359, dated November 8, 1904.

Application filed May 3, 1904. Serial No. 206,230. (No model.)

*To all whom it may concern:*

Be it known that I, WILLIAM L. F. MALABY, a citizen of the United States, residing at Goltry, in the county of Woods and Territory of Oklahoma, have invented a new and useful Animal-Poke, of which the following is a specification.

This invention relates to that class of devices which are known as "animal-pokes" and which are applied to the necks of horses or cattle for the purpose of preventing the same from jumping over or breaking through fences.

The invention has special reference to that class of animal-pokes which are provided with pivotally-disposed prongs or barbs normally held away from contact with the animal by means of suitably-disposed springs, but which in the event of the animal attempting to jump over or break through a fence will be actuated to jab the sides of the neck of the animal, which will thus be caused speedily to back out from the awkward and painful position.

The present invention has for its object to provide a device of the class referred to which shall possess superior advantages in point of simplicity, durability, and general efficiency; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being understood, however, that no limitation is necessarily made to the precise structural details therein exhibited, but that the right is reserved to any changes, alterations, and modifications which come fairly within the scope of the invention and which may be resorted to without departing from the spirit or sacrificing any of the advantages of the same.

In said drawings, Figure 1 is a perspective view of an animal-poke constructed in accordance with the principles of the invention. Fig. 2 is a horizontal sectional view of the same.

Corresponding parts in both figures are indicated by similar numerals of reference.

In carrying out my invention I provide a pair of yokes 1 and 2, adapted to be adjustably connected, at the ends thereof, for instance, by means of bolts 3, for the reception of which a plurality of perforations are provided, so that the parts or members 1 2 may be connected adjustably, as will be readily understood, the ends of said members being overlapped, as will be clearly seen in Fig. 1. These members combine to form an oblong or elliptical ring which may be readily fitted upon the neck of the animal.

One of the yoke members—in the present instance the member 2—has been shown as provided at the ends thereof with brackets 4 4, which when the said members are connected will occupy a position extending laterally from the sides of the elliptical ring. Pivotally connected with the brackets 4 are bell-crank levers 5 5, which in the present instance have been illustrated as being composed each of an upper and a lower member $5^a$ and $5^b$, although this special construction will not necessarily be adhered to. At the outer ends of the bell-crank levers, between the members $5^a$ and $5^b$, are adjustably secured the toothed members 6, having prongs or barbs 7, said toothed members being preferably mounted upon bolts, whereby they are connected with the free ends of the bell-crank levers in such a manner that by tightening the nuts upon said bolts the barbed members may be held securely in any position to which they may have been previously adjusted.

The yokes 1 and 2 are provided with exteriorly-disposed lugs 8 and 9, and pivotally connected with said lugs are bars 10 and 11, which extend, respectively, in a downward and an upward direction and which are provided at the extremities thereof with short forwardly-extending hook members 12 13. At their pivotal points the bars 10 and 11 are provided with forwardly-extending arms 14 15, having yokes 16 17 connected with or formed integral therewith. The arms of the yokes 16 and 17 each are provided with slots 18, and the arms of the two yokes 16 and 17 are connected adjustably by means of bolts 19, extending through the said slots 18, the arrangement being such as to permit the yokes to rock or move freely with relation to each other. Springs 20 are employed to force the free ends of the arms of the yokes 16 and 17 in the direction of the adjacent yokes 1 and 2.

The bolts 19 are connected, by means of links 21, with the inner end of the bell-crank levers 5.

In operation the device is adjusted upon the neck of the animal, where it is secured by properly connecting the yoke members 1 and 2, which, as already described, are adjustable, so as to fit the necks of various-sized animals. When the device is in position, it will be seen that the bars 10 and 11 extend downwardly and upwardly, said bars being of a length which will not prevent the animal from grazing. It will be understood that the loop members 16 and 17 will be disposed in front of the yoke members 1 and 2 and likewise that the devices are reversible end for end, it making no difference which of the yoke members 1 or 2 is uppermost. When the animal wearing the device attempts to break through or to jump over a fence, one or both of the bars 10 and 11 will come into contact with the obstruction offered by the fence and will rock upon their pivots, with the effect of forcing the inner or free ends of the arms of the yokes 16 and 17 in an outward or forward direction from the yokes 1 and 2 against the tension of the springs 20. The connecting-bolts 19 will thus, through the links 21, actuate the bell-crank levers 5, carrying the barbed members 6, which are thus caused to prick the sides of the neck of the animal, which will thus promptly back away. As soon as the animal withdraws from contact with the fence the tension of the springs will restore the device to normal position, at which the barbed members are withdrawn from the contact with neck of the animal.

Having thus described the invention, what is claimed is—

1. In a device of the class described, a neck-engaging member comprising two adjustably-connected yokes and having laterally-extending brackets.

2. In a device of the class described, a neck-engaging member comprising two adjustably-connected yokes, brackets extending laterally therefrom, and barb-carrying levers connected pivotally with said brackets.

3. In a device of the class described, a neck-engaging member having laterally-extending brackets, levers mounted pivotally upon said brackets, barbed members connected adjustably with said levers, and means for actuating the latter.

4. In a device of the class described, a neck-engaging member having laterally-extending brackets, said member including two suitably-connected yokes having exteriorly-disposed lugs, rocking arms connected pivotally with said lugs and having yokes at the ends thereof, barb-carrying levers upon the laterally-extending brackets of the neck-engaging member, means for adjustably connecting the free ends of the yokes extending from the rocking arms, and links connecting said connecting means with the free ends of the barb-carrying levers.

5. In a device of the class described, an adjustable neck-engaging frame having laterally-extending brackets, barbed levers mounted upon said brackets, rocking yokes connected with the neck-engaging frame and having slotted arms, connecting-bolts extending through said slotted arms, links connecting said bolts with the free ends of the barb-carrying levers, bars extending from the rocking yokes in an upward and downward direction, and spring means forcing the free ends of the rocking yokes normally in the direction of the neck-frame.

In testimony that I claim the foregoing as my own I have hereto affixed my signature in the presence of two witnesses.

WILLIAM L. F. MALABY.

Witnesses:
C. E. HERSCHBERGER,
L. A. SANTEE.